(12) United States Patent
Sugano et al.

(10) Patent No.: US 11,339,482 B2
(45) Date of Patent: May 24, 2022

(54) REDUCTION CATALYST BODY FOR CARBON DIOXIDE AND MANUFACTURING METHOD THEREOF, REDUCTION ELECTRODE, AND REDUCTION REACTION DEVICE

(71) Applicant: KABUSHIKI KAISHA TOSHIBA, Minato-ku (JP)

(72) Inventors: Yoshitsune Sugano, Kawasaki (JP); Akihiko Ono, Kita (JP); Jun Tamura, Chuo (JP); Ryota Kitagawa, Setagaya (JP); Asahi Motoshige, Ota (JP); Yuki Kudo, Yokohama (JP); Masakazu Yamagiwa, Yokohama (JP); Takayuki Tsukagoshi, Kawasaki (JP); Satoshi Mikoshiba, Yamato (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 502 days.

(21) Appl. No.: 15/915,408

(22) Filed: Mar. 8, 2018

(65) Prior Publication Data
US 2019/0085473 A1 Mar. 21, 2019

(30) Foreign Application Priority Data
Sep. 19, 2017 (JP) .............................. JP2017-178634

(51) Int. Cl.
*C25B 3/25* (2021.01)
*B01J 23/38* (2006.01)
(Continued)

(52) U.S. Cl.
CPC ................ *C25B 3/25* (2021.01); *B01J 23/06* (2013.01); *B01J 23/38* (2013.01); *B01J 23/50* (2013.01);
(Continued)

(58) Field of Classification Search
CPC ... B01J 23/42; B01J 23/44; B01J 23/50; B01J 23/52; B01J 23/72; B01J 23/755;
(Continued)

(56) References Cited

U.S. PATENT DOCUMENTS 8,304,365 B2 * 11/2012 Shao ................... B01J 37/0226
502/313
8,425,653 B2 * 4/2013 Mirkin .................. B82Y 30/00
75/371
(Continued)

FOREIGN PATENT DOCUMENTS

JP 2015-4120 1/2015
JP 2015-183470 10/2015
(Continued)

OTHER PUBLICATIONS

Ren et al ("Selective Electrochemical Reduction of Carbon Dioxide to Ethylene and Ethanol on Copper(I) Oxide Catalysts", ACS Catalysis, 2015, 5, pp. 2814-2821). (Year: 2015).*
(Continued)

*Primary Examiner* — Alexander W Keeling
(74) *Attorney, Agent, or Firm* — Oblon, McClelland, Maier & Neustadt, L.L.P.

(57) ABSTRACT

A reduction catalyst body for carbon dioxide of an embodiment includes a metal layer, and a projection provided on the metal layer. The projection is constituted of an aggregate of fine metal particles, and possesses a polyhedral structure having surfaces of three faces or more of a polygon. The projection has a site of reducing carbon dioxide, as at least a part of the surfaces.

6 Claims, 4 Drawing Sheets

(51) Int. Cl.
  *B01J 35/02* (2006.01)
  *B01J 23/50* (2006.01)
  *B01J 35/00* (2006.01)
  *C25B 11/081* (2021.01)
  *B01J 23/06* (2006.01)

(52) U.S. Cl.
  CPC .......... *B01J 35/002* (2013.01); *B01J 35/023* (2013.01); *B01J 35/026* (2013.01); *C25B 11/081* (2021.01); *C01P 2002/72* (2013.01); *C01P 2004/03* (2013.01)

(58) Field of Classification Search
  CPC .......... C25B 3/04; C25B 11/02; C25B 11/04; C25B 11/0405; C25B 11/0442; C25B 11/0447–11/0473
  See application file for complete search history.

(56) References Cited

U.S. PATENT DOCUMENTS

| | | | |
|---|---|---|---|
| 9,435,042 | B2 | 9/2016 | Zhou et al. |
| 10,344,388 | B2* | 7/2019 | Sugano ............... C25B 11/0473 |
| 10,533,987 | B2* | 1/2020 | Kim .................... B01J 35/0013 |
| 11,114,671 | B2* | 9/2021 | Xia ........................ C30B 29/607 |
| 2013/0048506 | A1 | 2/2013 | Chen |
| 2014/0326611 | A1* | 11/2014 | Yan ...................... H01M 4/925 205/630 |
| 2014/0346053 | A1 | 11/2014 | Deguchi et al. |
| 2016/0115605 | A1 | 4/2016 | Zhou et al. |
| 2018/0148846 | A1* | 5/2018 | Botte ........................ C25B 3/04 |
| 2019/0271089 | A1* | 9/2019 | Kas .......................... C25B 11/02 |

FOREIGN PATENT DOCUMENTS

| | | |
|---|---|---|
| JP | 2016-84535 A | 5/2016 |
| JP | 2016-084535 A | 5/2016 |
| JP | 2017-57492 | 3/2017 |

OTHER PUBLICATIONS

Zinola et al ("The Electrochemical Society, A Method for the Synthesis of Platinum Nanoparticles with Defined Crystalline Orientations and Their Catalytic Activity towards Nitrogen and Carbon Monoxide Oxidations", Journal of the Electrochemical Society, 164, 4, Jan. 2017, pp. H170-H182). (Year: 2017).*

Kohler et al ("Fabrication of highly porous platinum electrodes for micro-scale applications by pulsed electrodeposition and dealloying", Journal of Power Sources, 242, 2013, pp. 255-263). (Year: 2013).*

Kim et al ("ECS Meeting Abstracts Investigating the Plasmonic Hot-Carrier Injection Mechanism for CO2 Reduction Using Nanostructured Ag Catalysts", The Electrochemical Meeting Abstracts, 2017). (Year: 2017).*

* cited by examiner

REDUCTION CATALYST BODY FOR CARBON DIOXIDE AND MANUFACTURING METHOD THEREOF, REDUCTION ELECTRODE, AND REDUCTION REACTION DEVICE

CROSS REFERENCE TO RELATED APPLICATION

This application is based upon and claims the benefit of priority from Japanese Patent Application No. 2017-178634, filed on Sep. 19, 2017; the entire contents of which are incorporated herein by reference.

FIELD

Embodiments described herein relate generally to a reduction catalyst body for carbon dioxide and a manufacturing method thereof, a reduction electrode, and a reduction reaction device.

BACKGROUND

In recent years, depletion of fossil fuel such as petroleum or coal has been concerned, and expectation for sustainably-usable renewable energy has been rising. As the renewable energy, a solar cell, wind power generation, and the like can be cited. Because a power generation amount of these depends on weather and a natural situation, there is a problem that it is difficult to realize stable supply of electric power. For this reason, there has been made an attempt to store the electric power generated by the renewable energy in a storage battery, to thereby stabilize the electric power. However, when the electric power is stored, there are problems that a cost is required for the storage battery, and a loss occurs at a time of the storage.

With respect to such points, attention is focused on a technology in which, by using the electric power generated by the renewable energy, carbon dioxide ($CO_2$) is electrochemically reduced to be converted into a chemical substance (chemical energy) such as a carbon compound such as carbon monoxide (CO), a formic acid (HCOOH), methanol ($CH_3OH$), methane ($CH_4$), an acetic acid ($CH_3COOH$), ethanol ($C_2H_5OH$), ethane ($C_2H_6$), or ethylene ($C_2H_4$). When these chemical substances are stored in a cylinder or a tank, there are advantageous points that a storage cost of energy can be reduced, and a storage loss is also small, when compared to a case where the electric power (electric energy) is stored in the storage battery.

For the reduction of carbon dioxide, an electrode using a reduction catalyst, an electrode having a reduction catalyst layer, or the like is used as a reduction electrode. In order to activate a reduction reaction of carbon dioxide, improvement of a fine structure of the reduction catalyst has been conducted. For example, there is known a reduction electrode in which a nanoparticle catalyst exhibiting high activity with respect to the reduction reaction of carbon dioxide is applied to an electrode base material. In such a reduction electrode, there is a problem that a supported amount of the nanoparticle catalyst is limited and it is difficult to increase reaction active sites. Further, there is known a reduction electrode in which a metal substrate is etched through anodic oxidation or the like to form a porous layer. In this case, the reduction reaction is activated by a layer structure which is made to be porous by an aggregate of fine particles. However, since an entire shape of a surface of the porous layer of the reduction electrode is flat, there is a problem that an increase in the number of times of contact between the reduction catalyst and an electrolytic solution containing $CO_2$ or gaseous $CO_2$ is limited, and thus it is difficult to increase the reaction activity. In addition, from a viewpoint of reaction rate in a catalyst reaction, there is a problem that the activity is lowered due to a limited rate of diffusion into the inside of the porous layer.

DETAILED DESCRIPTION

A reduction catalyst body for carbon dioxide of an embodiment includes: a metal layer; and a projection including an aggregate of fine metal particles provided on the metal layer, and possessing a polyhedral structure having surfaces of three faces or more of a polygon, in which the projection has a site of reducing carbon dioxide, as at least a part of the surfaces.

Hereinafter, a reduction catalyst body of an embodiment and a manufacturing method thereof, a reduction electrode, and a reduction reaction device for carbon dioxide using the reduction electrode of the embodiment will be described with reference to the drawings. In each embodiment, substantially the same components are denoted by the same reference signs, and a description thereof is sometimes partially omitted. The drawings are schematic, and a relationship between a thickness and a planar size, thickness proportions of the respective portions, and the like are sometimes different from actual ones.

Figure 1:
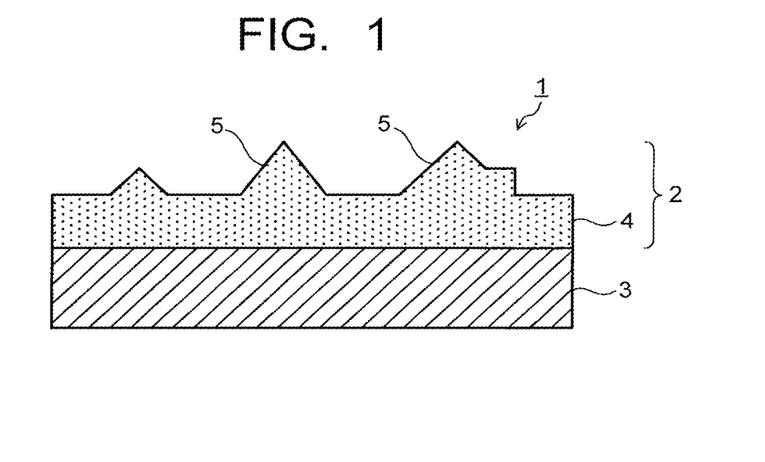
FIG. 1 is a sectional view illustrating a configuration of a reduction electrode of an embodiment.

First Embodiment/Reduction Catalyst Body and Manufacturing Method Thereof, and Reduction Electrode FIG. 1 is a sectional view illustrating a configuration of a reduction electrode according to an embodiment. A reduction electrode 1 illustrated in FIG. 1 includes a reduction catalyst body 2 for carbon dioxide ($CO_2$), and a conductive member 3 which is electrically connected to the reduction catalyst body 2, and which mainly functions as an electrode. The reduction catalyst body 2 for carbon dioxide has a function of causing a reduction reaction of carbon dioxide ($CO_2$) by being immersed into or brought into contact with an electrolytic solution containing carbon dioxide or brought into contact with gaseous carbon dioxide, to thereby produce a carbon compound such as carbon monoxide (CO), formic acid (HCOOH), methane ($CH_4$), methanol ($CH_3OH$), acetic acid ($CH_3COOH$), ethane ($C_2H_6$), ethylene ($C_2H_4$), ethanol ($C_2H_5OH$), formaldehyde (HCHO), acetaldehyde ($CH_3CHO$), ethylene glycol ($HOCH_2CH_2OH$), 1-propanol ($CH_3CH_2CH_2OH$), isopropanol ($CH_3CHOHCH_3$), acetylene ($C_2H_2$), glycerol ($C_3H_8O_3$), dihydroxyacetone ($C_3H_6O_3$), hydroxypyruvic acid ($C_3H_4O_4$), mesoxalic acid ($C_3H_2O_5$), oxalic acid ($C_2H_4O_4$), glyceraldehyde ($C_3H_6O_3$), glyceric acid ($C_3H_6O_4$), tartronic acid ($C_3H_4O_5$), glycolic acid ($C_2H_4O_3$), glyoxal ($C_2H_2O_2$), glycolaldehyde ($C_2H_4O_2$), or glyoxylic acid ($C_2H_2O_3$). The reduction catalyst body 2 has, on at least a part thereof, a site capable of electrically reducing carbon dioxide ($CO_2$) (which is also referred to as $CO_2$ reducing site, hereinafter).

The conductive member 3 is a part which is electrically connected to a power supply and which mainly serves as an electrode of the reduction electrode 1, as will be described later. FIG. 1 illustrates a state where the conductive member 3 and the reduction catalyst body 2 are stacked to be electrically connected, but, an existing form of the conductive member 3 is not limited to this. It is also possible that the conductive member 3 is physically separated from the reduction catalyst body 2, and is connected to the reduction catalyst body 2 only in an electrical manner. The conductive member 3 is only required to be able to make a current supplied from the power supply flow through the reduction catalyst body 2. Further, when the reduction catalyst body 2 itself has conductivity required of the electrode, it is also possible that the reduction catalyst body 2 is made to function also as the conductive member 3, to thereby omit the conductive member 3.

As a composing material of the conductive member 3, there can be cited a metal material containing at least one metal element selected from gold (Au), silver (Ag), copper (Cu), platinum (Pt), nickel (Ni), zinc (Zn), palladium (Pd), aluminum (Al), iron (Fe), manganese (Mn), titanium (Ti), tin (Sn), indium (In), gallium (Ga), and bismuth (Bi). The metal material may be a simple substance of the above-described metal element, or may also be an alloy containing the above-described metal elements such as an alloy like SUS, for example, an intermetallic compound, or the like. Moreover, for a composing material of the conductive member 3, it is also possible to use, for example, a light-transmissive and conductive metal oxide such as an ITO (Indium Tin Oxide), a ZnO (zinc oxide), a FTO (Fluorine-doped Tin Oxide), an AZO (Aluminum-doped Zinc Oxide), or an ATO (Antimony-doped Tin Oxide), a semiconductor of silicon, germanium, or the like, a conductive resin, or a conductive ion exchange membrane. The conductive member 3 may also be, for example, a stack including a metal material layer and another conductive material layer, a stack including a conductive material layer other than the metal material layer and another conductive material layer, or the like.

The conductive member 3 may also include a porous structure including pores through which an electrolytic solution can pass, or a structure having a through hole. The through hole may be structured to be communicated with a porous metal layer 4 from the conductive member 3. The porous structure can be obtained through a method in which the member is subjected to etching treatment to form pores, a method of using a porous material, or the like, for example. The conductive member 3 with the porous structure preferably has a pore distribution of not less than 1 μm nor more than 20 mm, for example. The through hole can be formed by performing etching on the conductive member 3, for example. In the conductive member 3 having the porous structure, a communicating pore can also be regarded as the through hole. With the use of the conductive member 3 having the porous structure or the through hole, it is possible to increase diffusibility of ions and a reactant via the pores or the through hole while securing high conductivity and a wide surface area of active surface.

The reduction catalyst body 2 includes the porous metal layer 4, and a plurality porous projections 5 provided on the porous metal layer 4. The porous metal layer 4 and the porous projection 5 are constituted of an aggregate of fine metal particles. The porous metal layer 4 and the porous projection 5 as above provide a place where a reduction reaction of $CO_2$ is caused. Note that the porous metal layer 4 may also partially contain a portion which is not porous, in other words, a bulky portion. Further, as long as the projection 5 is constituted of the aggregate of fine metal particles, the entire metal layer 4 may also be in a bulk state depending on circumstances. When it is considered to increase the reaction activity of the reduction reaction of $CO_2$, all of the porous metal layer 4 and the porous projection 5 are preferably constituted of the aggregate of fine metal particles.

The fine metal particle constituting the porous metal layer 4 and the porous projection 5 preferably has a diameter of not less than 5 nm nor more than 500 nm. The diameter of the fine metal particle is more preferably not less than 5 nm nor more than 100 nm. Moreover, the fine metal particle preferably contains a fine particle with a diameter of not less than 2 nm nor more than 10 nm. By constituting the porous metal layer 4 and the porous projection 5 by using the fine metal particle having the particle size (diameter) as above, a specific surface area dramatically increases, and a lot of crystal planes exist, resulting in that the reduction reaction activity of $CO_2$ can be improved. The diameter of the fine metal particle indicates the longest diameter of a single particle which is formed when performing division at a grain boundary of an aggregate in an observation image obtained by performing observation with a scanning electron microscope (SEM) of 500 to 1000 magnifications.

The porous metal layer 4 and the porous projection 5 preferably have a pore distribution of not less than 5 nm nor more than 20 μm. By applying the porous metal layer 4 and the porous projection 5 having such a pore distribution, it is possible to increase the reduction reaction activity of $CO_2$. Moreover, the pores in the porous metal layer 4 and the porous projection 5 preferably have a plurality of pore distribution peaks. Each of the plurality of pore distribution peaks preferably falls within the above-described range. With the use of the porous metal layer 4 and the porous projection 5 having the plurality of pore distribution peaks as above, it is possible to realize increase in the surface area, improvement of diffusibility of ions and a reactant, improvement of conductivity, and the like, which enables to increase the reduction reaction activity of $CO_2$.

The fine metal particle forming the porous metal layer 4 and the porous projection 5 preferably contains at least one selected from transition metal elements such as gold (Au), silver (Ag), copper (Cu), platinum (Pt), nickel (Ni), zinc (Zn), and palladium (Pd), alkali metal elements such as sodium (Na) and potassium (K), and alkali earth metal elements such as calcium (Ca) and magnesium (Mg). The metal material constituting the fine metal particle may be a simple substance of the above-described metal element, or may also be an alloy, an intermetallic compound, or the like containing the above-described metal elements. Further, the porous metal layer 4 and the porous projection 5 may also contain, in addition to the above-described metal material, a carbonate, a sulfate, a nitrate, a phosphate, a carbide, a nitride, an oxide, a sulfide, a selenide, a fluoride, a chloride, a bromide, an iodide, or the like of metal.

Out of the porous metal layer 4 and the porous projection 5 constituting the reduction catalyst body 2, at least the porous projection 5 has a site capable of electrically reducing $CO_2$ ($CO_2$ reducing site). Moreover, it is preferable that the porous metal layer 4 also has the $CO_2$ reducing site. The $CO_2$ reducing sites in the porous metal layer 4 and the porous projection 5 are only required to be provided on at least surfaces of the porous metal layer 4 and the porous projection 5, but, it is preferable that the $CO_2$ reducing site exists up to a position inside of the porous body. As the reduction catalyst body 2 having the $CO_2$ reducing site, there can be cited a reduction catalyst body 2 constituted of a reduction catalyst material of $CO_2$, namely, a material which reduces an activation energy for reducing $CO_2$, in other words, a material which reduces an overvoltage at a time of producing a carbon compound through a reduction reaction of $CO_2$ (material constituting $CO_2$ reducing site/$CO_2$ reduction catalyst material) and having at least the porous projection 5 formed thereon. It is preferable that in the reduction catalyst body 2, all of the porous metal layer 4 and the porous projection 5 are formed of a material constituting the $CO_2$ reducing site ($CO_2$ reduction catalyst material).

When the porous metal layer 4 and the porous projection 5 are formed of the $CO_2$ reduction catalyst material, there can be cited, as the $CO_2$ reduction catalyst material, a metal material containing at least one metal element selected from gold (Au), silver (Ag), copper (Cu), platinum (Pt), nickel (Ni), zinc (Zn), and palladium (Pd). The metal material as the $CO_2$ reduction catalyst material may be a simple substance of the above-described metal element, or may also be an alloy containing the above-described metal elements. Note that depending on circumstances, it is also possible to form only the porous projection 5 by using the $CO_2$ reduction catalyst material containing the above-described metal element. The $CO_2$ reducing site is preferably electrically communicated with the porous metal layer 4 and the porous projection 5, or at least the porous projection 5.

The reduction catalyst body 2 is not limited to be configured such that it is entirely formed of the $CO_2$ reduction catalyst material. The reduction catalyst body 2 having the $CO_2$ reducing site may also have a configuration in which the porous metal layer 4 and the porous projection 5 are formed of a metal material other than the $CO_2$ reduction catalyst material, and the $CO_2$ reduction catalyst material is made to exist on surfaces of the porous metal layer 4 and the porous projection 5. The $CO_2$ reduction catalyst material may be made to exist also in the inside of the porous metal layer 4 and the porous projection 5. The $CO_2$ reduction catalyst material may be made to exist only on the surface of the porous projection 5. As a method of making the $CO_2$ reduction catalyst material exist in the porous metal layer 4 and the porous projection 5, it is possible to employ a method of applying fine particles (nanoparticles), a dispersion liquid, a solution, or the like of the $CO_2$ reduction catalyst material to the porous metal layer 4 and the porous projection, but, the method is not limited to this. In such a case, as the $CO_2$ reduction catalyst material, it is possible to use, in addition to the above-described metal materials (Au, Ag, Cu, Pt, Ni, Zn, Pd), a carbon material such as carbon, graphene, carbon nanotube, fullerene, or ketjen black, or a metal complex such as a Ru complex or a Re complex. Moreover, the $CO_2$ reduction catalyst material may be a composite material containing two or more of any of the aforementioned metal material, carbon material, and metal complex, and it may also contain organic molecules or the like.

Figure 2:
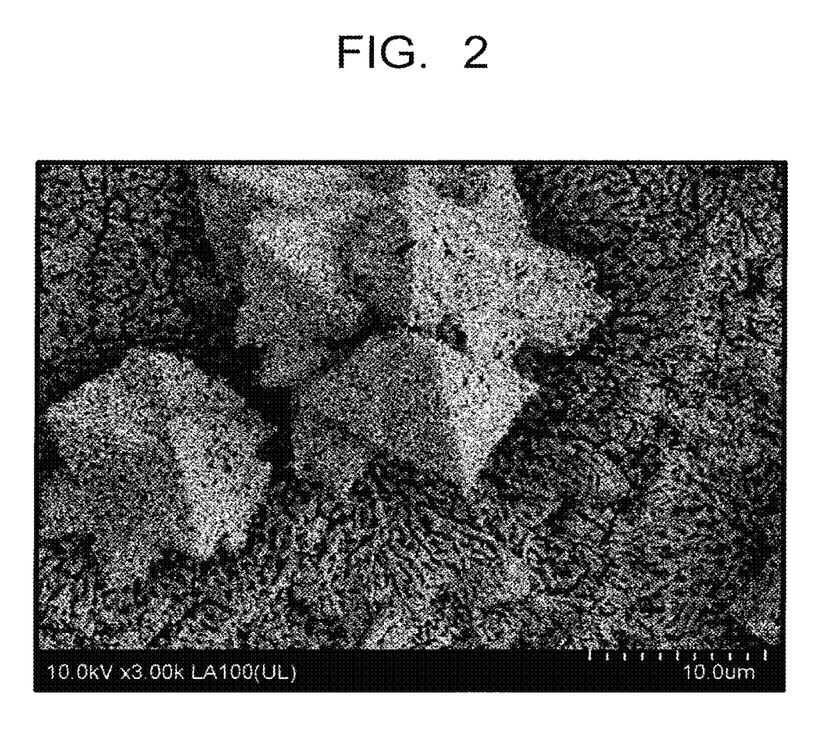
FIG. 2 is a SEM photograph showing a result of observing a surface state of a reduction catalyst body in a reduction electrode of example 1.
Figure 3:
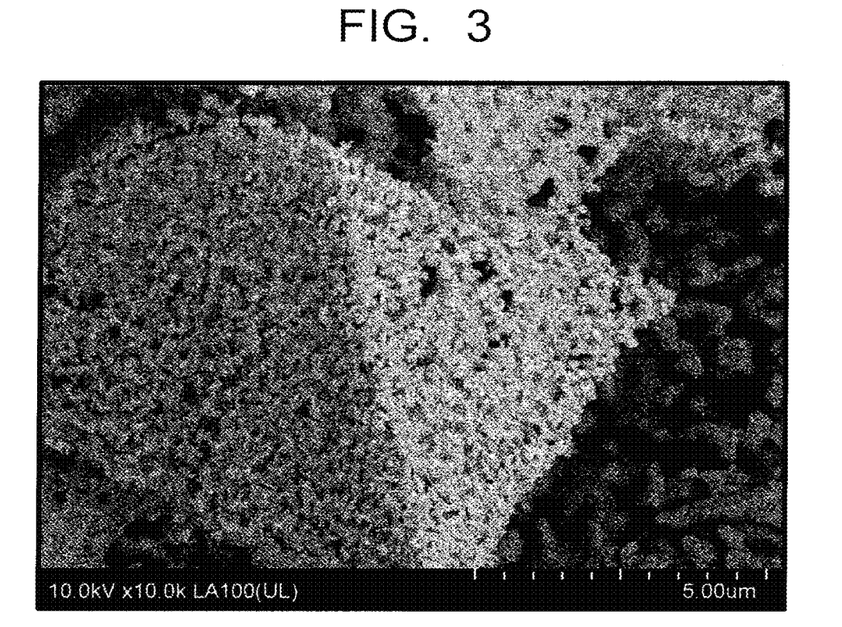
FIG. 3 is a SEM photograph showing a result of observing the surface state of the reduction catalyst body in the reduction electrode of example 1.

The porous projection 5 in the reduction catalyst body 2 is constituted of the aggregate of fine metal particles as described above, and has a convex polyhedral structure formed of surfaces of three faces or more of a polygon. As a concrete shape of the porous projection 5, there can be cited a cone or a frustum such as a pyramid or a truncated pyramid. Note that the surfaces of the polygon described above are surfaces exposed from the porous metal layer 4, and do not include a bottom surface which is brought into contact with the porous metal layer 4. The pyramid constituting the porous projection 5 is a triangular pyramid, a quadrangular pyramid, a polygonal pyramid with five angles or more, or the like, and it is not particularly limited. The truncated pyramid is also not particularly limited, and it is a triangular truncated pyramid, a quadrangular truncated pyramid, a polygonal truncated pyramid with five angles or more. The porous projection 5 may be formed in a manner that, to one projection, another projection is adjacent, or a plurality of projections are adjacent to each other. Moreover, the porous projection 5 may also employ a shape in which on a side surface or an upper surface of one projection, another projection is formed, a shape in which the above formation is repeated a plurality of times so that the projections are stacked, or the like. FIG. 2 and FIG. 3 illustrate a result of observing, with a SEM, a surface of the reduction catalyst body 2 produced in example 1 to be described later (SEM images). FIG. 3 is a SEM image as a result of further enlarging a part of the SEM image in FIG. 2. As is apparent from these SEM images, it can be understood that the porous projection 5 has a polyhedral structure formed of a pyramid or a truncated pyramid, or a combination of the pyramid and the truncated pyramid, and is formed of an aggregate of fine metal particles.

The porous projection 5 has the $CO_2$ reducing site on at least a part of a surface thereof or the entire surface thereof, as described above. By using the reduction catalyst body 2 and the reduction electrode 1 having such a porous projection 5, it is possible to increase the reaction activity of the reduction reaction of $CO_2$. Specifically, with the use of the reduction catalyst body 2 having the porous projection 5, a surface area of the reduction catalyst body 2 increases (except for increase in surface area caused by porous body), so that it is possible to increase the number of times of contact between the reduction catalyst body 2 and an electrolytic solution containing $CO_2$ or a fluid containing a reactant ($CO_2$) such as gaseous $CO_2$. Moreover, since the fluid containing the reactant is brought into contact with the reduction catalyst body 2 having the porous projection 5 in a turbulent flow state, the number of times of contact of the reactant ($CO_2$) with the porous metal layer 4 and the porous projection 5 increases, and further, diffusion of the reactant ($CO_2$) into pores of the porous metal layer 4 and the porous projection 5 is facilitated. Such an effect is increased by constituting the porous projection 5 with the pyramid, the truncated pyramid, or the like, and is further increased as the porous projection 5 exists in a more irregular and complicated manner. These enable to improve the reaction activity of the reduction reaction of $CO_2$.

The porous projection 5 preferably has the following shape, in order to obtain the above-described effect of increasing the reaction activity of the reduction reaction of $CO_2$ more stably. Specifically, a length of the longest side of the pyramid or the truncated pyramid constituting the porous projection 5 is preferably not less than 1 μm nor more than 50 μm. When the length of the longest side of the porous projection 5 is too large, the reaction activity is lowered since a reaction cycle of the catalyst inside the projection 5 is smaller than that of the catalyst on the surface from a viewpoint of diffusibility of a substrate. When the length of the longest side of the porous projection 5 is too small, a collision frequency between the fluid containing the reactant and the porous projection 5 is lowered, and it is not possible to sufficiently obtain the above-described effect of improving the reaction activity. The length of the longest side of the porous projection 5 indicates a length of one side of a portion projected from a surface of the porous metal layer 4, in an observation image obtained by performing observation with the SEM of 500 to 1000 magnifications.

A thickness of the porous metal layer 4 including the porous projection 5 is preferably not less than 1 μm nor more than 20 mm. The thickness mentioned here is a thickness from a surface on a side opposite to a surface on which the porous projection 5 is formed of the porous metal layer 4 to a top portion of the porous projection 5 in a vertical direction. When the thickness of the porous metal layer 4 including the porous projection 5 is too thin, it is not possible to sufficiently increase the reaction activity. On the other hand, when the thickness of the porous metal layer 4 including the porous projection 5 is too thick, peeling from the conductive member 3 or the like becomes likely to occur, and there is a possibility that the effect of the reduction catalyst body 2 cannot be sufficiently exhibited.

The porous projection 5 preferably has a shape derived from a crystal shape based on a compound obtained in a manner that a metal material is oxidized or eluted to be precipitated, which makes a valence of the metal material shift to a positive valence. For example, there exists a shape derived from a crystal structure of a triclinic system, a monoclinic system, an orthorhombic crystal system, a hexagonal system, a trigonal system, a tetragonal system, a cubic system, or the like, and made by a lattice plane capable of being obtained in accordance with a point group and a space group which exist in each crystal system. For example, when a point group is m3m and a space group is Pm-3m in a tetragon, there can be cited a cube, a regular hexahedron, a truncated octahedron, a cubic octahedron, and the like. The shapes of these do not necessarily have to be perfect crystal shapes, and a part thereof is only required to be formed. Further, a twin crystal may be employed, a part of the crystal may be chipped, or the twin crystal and the chipped crystal may be mixed. It is more preferable to adopt a structure in which a large number of porous projections 5 are adjacent to each other, and with this structure, the collision frequency between the fluid and the $CO_2$ reduction catalyst increases, resulting in that the reduction reaction activity of $CO_2$ can be improved.

Further, in an X-ray diffraction (XRD) measurement, when a maximum value of a peak intensity deriving from a {111} plane is set to $I_{111}$, a maximum value of a peak intensity deriving from a {100} plane is set to $I_{100}$, and a maximum value of a peak intensity deriving from a {110} plane is set to $I_{110}$, the $CO_2$ reduction catalyst (fine metal particle) existing in the porous projection 5 preferably has an $I_{111}/I_{100}$ ratio of 2.0 or more, and preferably has an $I_{111}/I_{110}$ ratio of 1.2 or more. By satisfying such a condition, a large number of crystal planes having high activity with respect to the $CO_2$ reduction reaction exist, so that it is possible to increase selective $CO_2$ reduction reaction activity. The $I_{111}/I_{100}$ ratio is more preferably 2.2 or more, and still more preferably 2.5 or more. The $I_{111}/I_{110}$ ratio is more preferably 1.5 or more, and still more preferably 1.8 or more. The above-described condition is effective when the $CO_2$ reduction catalyst contains a metal forming a face-centered cubic lattice structure in a standard state, and concretely, there can be cited a $CO_2$ reduction catalyst containing at least one metal element selected from Ni, Cu, Pd, Ag, Pt, Au, and Pb. The $CO_2$ reduction catalyst may be an alloy containing the above-described metal elements, or a metal material which forms a face-centered cubic lattice as a form of an alloy with another metal which does not form the face-centered cubic lattice.

The porous metal layer 4 including the porous projection 5 is produced as follows, for example. A formation step of the porous metal layer 4 including the porous projection 5 includes a step of immersing, into an electrolytic solution containing a compound containing a counter anion capable of forming a salt or a complex with a metal forming the porous metal layer 4, a metal base material containing the metal forming the porous metal layer 4, a step of applying an electric potential at which the metal base material can be oxidized, to the metal base material immersed into the electrolytic solution, and a step of applying an electric potential at which the metal base material can be reduced, to the metal base material immersed into the electrolytic solution.

The formation step of the porous metal layer 4 including the porous projection 5 will be described in detail hereinafter. First, the metal base material containing the metal forming the porous metal layer 4 is immersed into the electrolytic solution containing the compound containing the counter anion capable of forming the salt or the complex with the metal. The remainder of the metal base material after the formation of the porous metal layer 4 and the porous projection 5 can also be utilized as the conductive member 3. As the compound (electrolyte) to be contained in the electrolytic solution, there can be cited, for example, a carbonate, a hydrogen carbonate, a sulfate, a nitrate, a phosphate, a borate, a carbide, a nitride, an oxide, a sulfide, a selenide, a fluoride, a chloride, a bromide, or an iodide of metal, a complex compound thereof, acids such as hydrochloric acid, sulfuric acid, nitric acid, carbonic acid, phosphoric acid, and organic acid, an inorganic base such as a sodium hydroxide or a potassium hydroxide, an organic base such as ammonia or amine, or the like. Each of these may be used solely or a plurality of these may be mixed to be used, and further, an organic molecule, an organic complex, or the like may also be contained.

A constant current or electric potential is applied to the metal base material immersed into the electrolytic solution, and the metal base material is oxidized, or the metal base material is eluted in the electrolytic solution and then a reaction product with the counter anion in the aforementioned compound is precipitated. The oxidation and the elution of the metal base material and the precipitation may be simultaneously caused, or either of them may be caused. The electric potential to be applied to the metal base material is preferably a more electropositive potential than an oxidation potential of the metal base material, and it is desirably a far more electropositive potential than the oxidation potential. Also when the constant current is applied, the current is set so that the above-described electric potential is satisfied. By configuring as above, the oxidation or the elution of the metal base material becomes fast and is performed in a more disorderly manner, so that it becomes easy to obtain the porous configuration in a reduction step to be performed thereafter, and it becomes easy to form the porous projection 5. Note that the oxidation potential indicates an electric potential at which metal species can shift from a zero valence to a certain positive valence. Specifically, the oxidation potential indicates an electric potential at which $M^0$ changes to $M^+$, or $M^0$ changes to $M^{2+}$, or the like, for example.

Next, to the metal base material oxidized in the aforementioned step or the metal base material eluted and then re-precipitated in the aforementioned step, a constant current or electric potential is applied while maintaining a state where the metal base material is immersed into the electrolytic solution, to thereby reduce the oxide or the re-precipitated substance of the metal base material. The electric potential to be applied here is preferably a more electronegative potential than a reduction potential of the metal base material, and it is desirably a far more electronegative potential than the reduction potential. Also when the constant current is applied, the current is set so that the above-described electric potential is satisfied. By configuring as above, a rate at which the compound produced when the valence of the metal material shifts to a positive valence is reduced to the original zero valence, becomes fast, and the metal material is reconstructed in a more disorderly manner at the time of reduction, so that it becomes easy to obtain the porous configuration, and it becomes easy to form the projection form. Specifically, by reducing the oxide or the re-precipitated substance of the metal base material (carbonate or the like of metal), the porous metal layer 4 is formed, and at the same time, the porous projection 5 is formed on the surface of the porous metal layer 4. At this time, there is formed the porous projection 5 having the shape derived from the crystal shape of the compound (oxide, carbonate, or the like) obtained when the valence of the metal base material is shifted to a positive valence, and having the projection shape derived from the re-precipitated substance or the like. Note that the reduction potential indicates an electric potential at which metal species can shift from a certain positive valence to a zero valence. Specifically, the oxidation potential indicates an electric potential at which $M^+$ changes to $M^0$, or $M^{2+}$ changes to $M^0$, or the like, for example.

As described above, in the state where the metal base material is immersed into the electrolytic solution containing the compound capable of forming the salt or the complex with the metal forming the porous metal layer 4, the oxidation potential and the reduction potential of the metal are applied in this order to reduce the compound (the oxide, the carbonate, or the like) produced when the valence shifts to a positive valence due to the oxidation of the metal material, thereby making a part in the vicinity of the surface of the metal base material to be porous, and thus the porous metal layer 4 can be formed. Moreover, by reducing the re-precipitated substance precipitated in the surface of the porous metal layer 4 or the like, it is possible to form the porous projection 5 having the projection shape derived from the crystal structure of the compound produced when the valence of the metal material is shifted to a positive valence. Further, the remainder which does not get involved in the oxidation and the reduction of the metal base material can be utilized as the conductive member 3. These make it possible to obtain the reduction electrode 1 including the conductive member 3, and the porous metal layer 4 having the porous projection 5. Note that as described above, the conductive member 3 may be physically separated from the porous metal layer 4, and in such a case, the conductive member 3 is electrically connected to the porous metal layer 4.

Second Embodiment/Reduction Reaction Device for Carbon Dioxide

Figure 5:
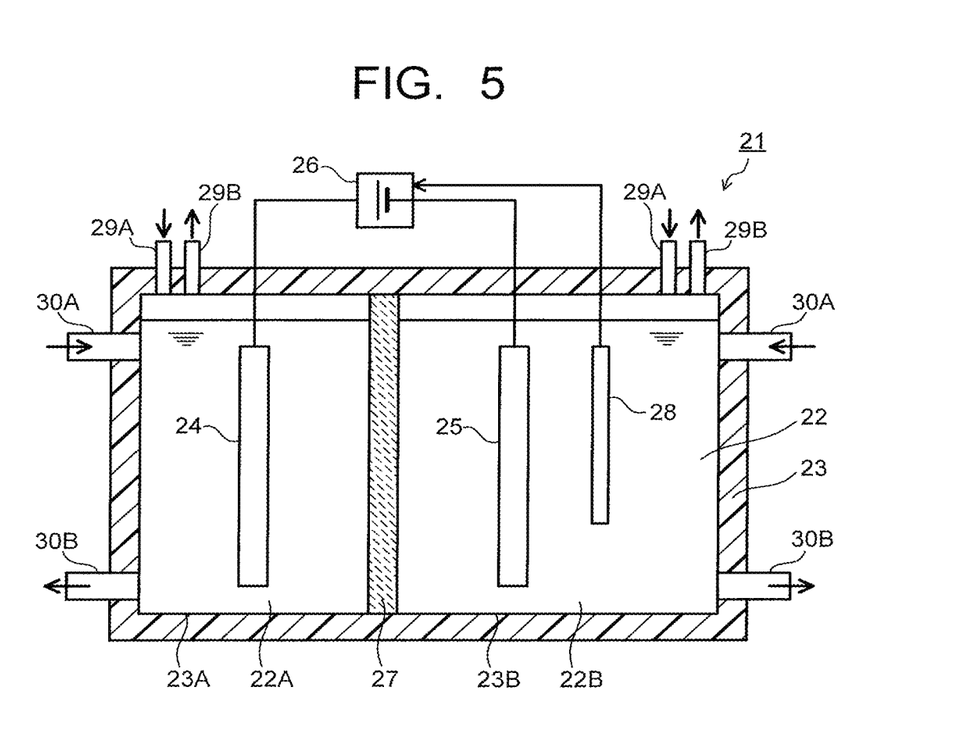
FIG. 5 is a sectional view illustrating a reduction reaction device for carbon dioxide of an embodiment.

Next, a reduction reaction device (electrolytic device) for carbon dioxide using the reduction electrode 1 according to the first embodiment will be described with reference to FIG. 5. Note that a configuration of the reduction reaction device illustrated in FIG. 5 is only one example, and various modifications can be made as long as the reduction reaction device is a reaction device capable of causing a reduction reaction of carbon dioxide by using the reduction electrode 1 according to the first embodiment. A reduction reaction device 21 illustrated in FIG. 5 includes an electrolytic tank 23 accommodating an electrolytic solution 22 containing water ($H_2O$) and carbon dioxide ($CO_2$), an oxidation electrode 24, a reduction electrode 25, and a power supply 26. The oxidation electrode 24 and the reduction electrode 25 are disposed inside the electrolytic tank 23, and immersed into the electrolytic solution 22. The power supply 26 is disposed outside the electrolytic tank 23. The power supply 26 is connected to the oxidation electrode 24 and the reduction electrode 25.

The electrolytic tank 23 is separated into two chambers by an ion moving layer (ion moving layer which also serves as a separation wall) 27 capable of moving ions. The electrolytic tank 23 separated into two chambers includes a first accommodating part 23A accommodating a first electrolytic solution 22A into which the oxidation electrode 24 is immersed, and a second accommodating part 23B accommodating a second electrolytic solution 22B into which the reduction electrode 25 is immersed. The oxidation electrode 24 is disposed in the first accommodating part 23A, and the reduction electrode 25 is disposed in the second accommodating part 23B. In the second accommodating part 23B, there is disposed a reference electrode 28 that controls a current which flows between the oxidation electrode 24 and the reduction electrode 25 and an electric potential of the reduction electrode 25. The reference electrode 28 is disposed according to need.

The ion moving layer 27 is constituted of an ion exchange membrane or the like capable of making ions move between the oxidation electrode 24 and the reduction electrode 25, and capable of separating the first electrolytic solution 22A and the second electrolytic solution 22B. As the ion exchange membrane, for example, a cation exchange membrane such as Nafion or Flemion, or an anion exchange membrane such as Neosepta or Selemion is used. A material other than the above can be used as the ion moving layer 27 as long as it can make ions move between the oxidation electrode 24 and the reduction electrode 25. To the electrolytic tank 23, a gas inlet pipe 29A, a gas outlet pipe 29B, a solution inlet pipe 30A, and a solution outlet pipe 30B are connected. These are provided to each of the first accommodating part 23A and the second accommodating part 23B. The gas outlet pipe 29B is connected to a collection part (not illustrated) of a product produced through the oxidation-reduction reaction.

The oxidation electrode 24 is an electrode which causes an oxidation reaction of water ($H_2O$) in the electrolytic solution 22 to produce oxygen ($O_2$) or hydrogen ions ($H^+$). The reduction electrode 25 is an electrode which causes a reduction reaction of carbon dioxide ($CO_2$) in the electrolytic solution 22 or a reduction reaction of a carbon compound obtained thereby to produce a carbon compound. In order to cause the oxidation reaction in the oxidation electrode 24, the oxidation electrode 24 is connected to a positive electrode (+) terminal of the power supply 26. In order to cause the reduction reaction in the reduction electrode 25, the reduction electrode 25 is connected to a negative electrode (−) terminal of the power supply 26.

The reduction electrode 25 is an electrode which reduces carbon dioxide to produce a carbon compound, and the reduction electrode 1 according to the first embodiment is used. The oxidation electrode 24 is preferably constituted of a material capable of oxidizing water to produce oxygen or hydrogen ions, and capable of reducing an overvoltage in such a reaction. As such a material, there can be cited a metal such as platinum (Pt), palladium (Pd), or nickel (Ni), an alloy or an intermetallic compound containing the above metals, a binary metal oxide such as a manganese oxide (Mn—O), an iridium oxide (Ir—O), a nickel oxide (Ni—O), a cobalt oxide (Co—O), an iron oxide (Fe—O), a tin oxide (Sn—O), an indium oxide (In—O), or a ruthenium oxide (Ru—O), a ternary metal oxide such as Ni—Co—O, Ni—Fe—O, La—Co—O, Ni—La—O, or Sr—Fe—O, a quaternary metal oxide such as Pb—Ru—Ir—O or La—Sr—Co—O, or a metal complex such as a Ru complex or an Fe complex. The oxidation electrode 24 can employ various shapes such as a plate shape, a mesh shape, a wire shape, a particle shape, a porous shape, a thin film shape, and an island shape. It is also possible to apply a composite electrode obtained by stacking these materials on a base material, to the oxidation electrode 24.

The first electrolytic solution 22A is a solution containing at least water ($H_2O$), and the second electrolytic solution 22B is a solution containing at least carbon dioxide ($CO_2$). To the first electrolytic solution 22A and the second electrolytic solution 22B, the same solution may be applied or different solutions may be applied. When the same solution is applied to the first electrolytic solution 22A and the second electrolytic solution 22B, a one solution-type electrolytic tank 23 may also be applied.

As a solution containing $H_2O$, for example, an aqueous solution containing an arbitrary electrolyte is used. This solution is preferably an aqueous solution which facilitates the oxidation reaction of $H_2O$. As the aqueous solution containing the electrolyte, there can be cited, for example, an aqueous solution containing a phosphate ion ($PO_4^{2-}$), a borate ion ($BO_3^{3-}$), a hydrogen carbonate ion ($HCO_3^{-}$), a sodium ion ($Na^+$), a potassium ion ($K^+$), a calcium ion ($Ca^{2+}$), a lithium ion ($Li^+$), a cesium ion ($Cs^+$), a magnesium ion ($Mg^{2+}$), a chloride ion ($Cl^-$), a bromide ion ($Br^-$), an iodide ion ($I^-$), or the like.

The solution containing $CO_2$ is preferably a solution with high $CO_2$ absorptance, and as the solution, there can be cited an aqueous solution of $LiHCO_3$, $NaHCO_3$, $KHCO_3$, $CsHCO_3$, or the like. For the solution containing $CO_2$, it is possible to use alcohols such as methanol, ethanol, and acetone. The solution containing $CO_2$ is desirably a solution reducing a reduction potential of $CO_2$, having high ion conductivity, and containing a $CO_2$ absorbent which absorbs $CO_2$. For such a solution, it is also possible to use an ionic liquid which is made of salts of cations such as imidazolium ions or pyridinium ions and anions such as $BF_4^-$ or $PF_6^-$ and which is in a liquid state in a wide temperature range, or its aqueous solution. As another solution, there can be cited an amine solution of ethanolamine, imidazole, pyridine, or the like, or an aqueous solution thereof. As amine, any of primary amine, secondary amine, and tertiary amine is applicable.

Next, an operation of the electrolytic device 21 will be described. When a current is supplied from the power supply 26 to the oxidation electrode 24, an oxidation reaction of water ($H_2O$) occurs in the vicinity of the oxidation electrode 24 which is brought into contact with the first electrolytic solution 22A. Concretely, as presented in the following formula (1), $H_2O$ contained in the first electrolytic solution 22A is oxidized, and oxygen ($O_2$) and hydrogen ions ($H^+$) are produced.

$$2H_2O \rightarrow 4H^+ + O_2 + 4e^- \qquad (1)$$

$H^+$ produced in the oxidation electrode 24 side moves in the electrolytic solutions 22A and 22B, and reaches the vicinity of the reduction electrode 25. A reduction reaction of carbon dioxide ($CO_2$) occurs by the current (electrons ($e^-$)) supplied from the power supply 26 to the reduction electrode 25 and $H^+$ moved to the vicinity of the reduction electrode 25. The reduction reaction of $CO_2$ proceeds in accordance with the following formula (2), and CO is produced from $CO_2$, for example.

$$2CO_2 + 4H^+ + 4e^- \rightarrow 2CO + 2H_2O \qquad (2)$$

The reduction reaction product of $CO_2$ is not limited to CO, and it is possible to produce various carbon compounds as described above in accordance with a type and the like of the reduction catalyst.

Note that the configuration of the reduction reaction device illustrated in FIG. 5 is only one example, and various modifications can be made as long as the reduction reaction device is a reaction device capable of causing the reduction reaction of carbon dioxide by using the reduction electrode 1 according to the first embodiment. For example, the reduction reaction device illustrated in FIG. 5 has a structure in which the oxidation electrode 24 and the reduction electrode 25 are immersed into the electrolytic solution 22, but, a structure in which the oxidation electrode 24 and the reduction electrode 25 are brought into contact with the electrolytic solution 22 is not limited to this. For example, it is also possible to provide an electrolytic solution flow path through which the electrolytic solution is flowed, so that the oxidation electrode 24 and the reduction electrode 25 are brought into contact with the electrolytic solution 22. Further, it is also possible that a gas flow path which supplies $CO_2$ so that gaseous $CO_2$ is brought into contact with the reduction electrode 25 is provided, instead of the structure of supplying $CO_2$ into the electrolytic solution 22. Other than the above, various modifications can be made.

EXAMPLES

Next, examples and evaluation results thereof will be described.

Example 1, Comparative Example 1

First, a reduction electrode was produced in the following manner. First, a silver plate as a metal base material was immersed into an aqueous solution containing potassium hydrogen carbonate (0.5 M). Next, an electric potential (2 V (vs RHE)) which was more electropositive than an oxidation potential of silver was applied for one hour to the silver plate immersed into the aqueous potassium hydrogen carbonate solution, and an electric potential (−1.5 V (vs RHE)) which was more electronegative than a reduction potential of silver was then applied for 30 minutes, to thereby produce a reduction electrode having a $CO_2$ reduction catalyst.

A result of observing, with the SEM, a surface structure of the reduction electrode obtained as above (SEM image) is illustrated in FIG. 2. FIG. 3 is a SEM image as a result of further enlarging a part of a porous metal layer illustrated in FIG. 2. As is apparent from FIG. 2 and FIG. 3, it can be understood that the reduction electrode produced in example 1 has a structure in which a porous metal layer (Ag layer)

having a plurality of porous projections is formed on a conductive member made of an Ag plate material. The porous metal layer is constituted of an aggregate of Ag fine particles. Further, the porous projection has a projection shape of a pyramid or a truncated pyramid, or a combination of the pyramid and the truncated pyramid, and furthermore, it is constituted of an aggregate of Ag fine particles.

Figure 4:
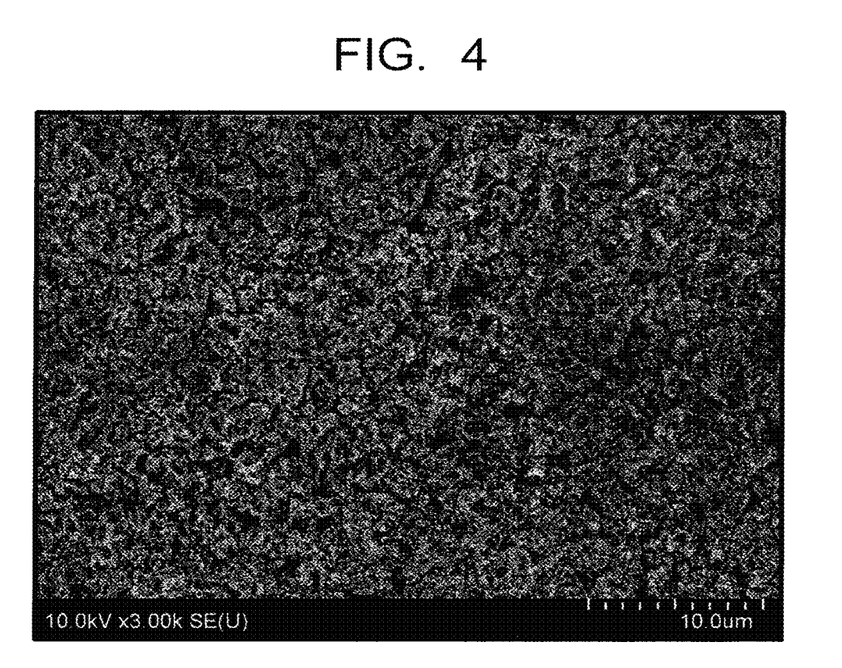
FIG. 4 is a SEM photograph showing a result of observing a surface state of a reduction catalyst body in a reduction electrode of comparative example 1.

As comparative example 1, a reduction electrode was produced by slightly changing the manufacturing conditions in example 1. Concretely, a period of time of applying the oxidation potential was changed from one hour to three minutes, and the other conditions were set to the same. A result of observing, with the SEM, a surface structure of the reduction electrode produced in comparative example 1 (SEM image) is illustrated in FIG. 4. As is apparent from FIG. 4, in the reduction electrode produced in comparative example 1, a porous metal layer constituted of an aggregate of fine particles existed, but, no porous projection having a shape of a pyramid or a truncated pyramid was observed on a surface of the porous metal layer. From this point, it can be understood that the porous projection can be obtained when the metal base material is sufficiently oxidized and then reduced.

<Evaluation of Reduction Electrode>
[XRD Measurement]

Figure 6:
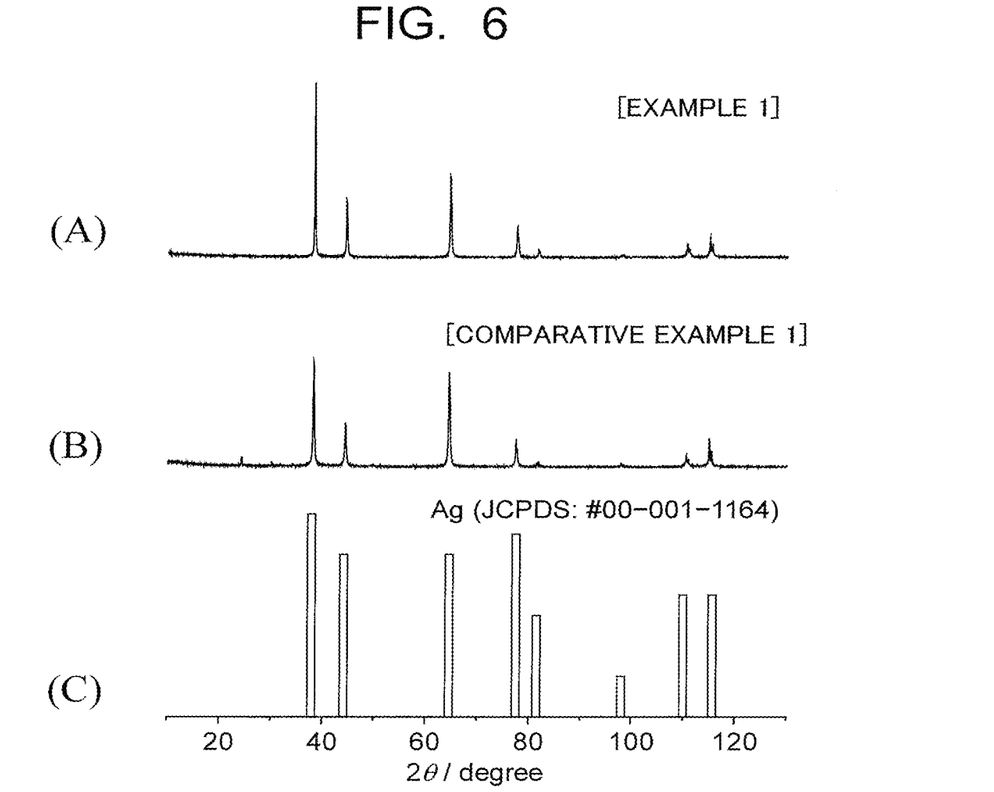
FIG. 6 is diagrams illustrating X-ray diffraction peaks of reduction catalyst bodies in the reduction electrodes produced in example 1 and comparative example 1.

Regarding the $CO_2$ reduction catalyst body (the porous metal layer having the porous projection) of the reduction electrode obtained in example 1, and the $CO_2$ reduction catalyst body (the porous metal layer having no porous projection) of the reduction electrode obtained in comparative example 1, X-ray diffraction measurement was performed to measure diffraction peaks. Measurement results thereof are presented in FIG. 6. FIG. 6A illustrates a diffraction peak in example 1, and FIG. 6B illustrates a diffraction peak in comparative example 1. FIG. 6C illustrates a diffraction peak in JCPDS (00-001-1164) of silver. Moreover, from the diffraction peaks in FIG. 6A and FIG. 6B, a ratio between a maximum value $I_{111}$ of a peak intensity deriving from a {111} plane and a maximum value $I_{100}$ of a peak intensity deriving from a {100} plane, and a ratio between the maximum value $I_{111}$ of the peak intensity deriving from the {111} plane and a maximum value $I_{110}$ of a peak intensity deriving from a {110} plane, ($I_{111}/I_{100}$ and $I_{111}/I_{110}$) were calculated. Results thereof are presented in Table 1.

TABLE 1

| Electrode | $I_{111}/I_{100}$ | $I_{111}/I_{100}$ |
|---|---|---|
| Example 1 | 2.18 | 1.32 |
| Comparative example 1 | 2.08 | 0.95 |

As is apparent from Table 1, it can be understood that the peak intensity ratio of the $CO_2$ reduction catalyst in example 1 is larger than the peak intensity ratio derived from silver described in JCPDS (04-0784). This indicates that the {111} plane is selectively formed when compared to the {100} plane and the {110} plane, and a structure in which a large number of crystal planes having high activity with respect to the $CO_2$ reduction reaction exist is formed. Therefore, it becomes possible to exhibit selective $CO_2$ reduction activity.

[Reduction Selectivity of $CO_2$]

Regarding the $CO_2$ reduction electrode having the projection shape obtained in example 1 and the $CO_2$ reduction electrode obtained in comparative example 1, production selectivity of carbon monoxide (CO) in the $CO_2$ reduction reaction was measured. The $CO_2$ reduction reaction was caused by using the $CO_2$ reduction reaction device illustrated in FIG. 5. By using an airtight H-cell equipped with a $CO_2$ reduction electrode normalized to 4.5 cm², a platinum electrode as an oxidation electrode, an aqueous potassium hydrogen carbonate solution (0.5 M) saturated with dissolved $CO_2$ as an electrolytic solution (each cell: 30 mL), and a Selemion TM membrane as an anion exchange membrane, $CO_2$ was blown at 200 mL/min, and a constant electric potential of −1.7 V (vs Ag/AgCl (saturated KCl)) was applied by using an Ag/AgCl (saturated KCl) electrode as a reference electrode. Measurement results of the CO production selectivity after 1.5 hours are presented in Table 2.

TABLE 2

| Electrode | CO production selectivity [%] |
|---|---|
| Example 1 | 93.1 |
| Comparative example 1 | 49.3 |

As is apparent from Table 2, it can be understood that the $CO_2$ reduction electrode produced in example 1 can obtain CO with selectivity higher than that of the $CO_2$ reduction electrode produced in comparative example 1. Note that the CO production selectivity was determined as follows. A gas composition was analyzed by gas chromatography, a liquid composition was analyzed by ion chromatography, and a production amount of CO and a production amount of substance other than CO were determined. The product other than CO is mainly hydrogen. A proportion of the production amount of CO in the production amount of the reduction reaction product was determined as the CO production selectivity.

Note that configurations of the above-described respective embodiments may be each applied in combination, and further may be partially substituted. Herein, while certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the invention.

What is claimed is:

1. A reduction catalyst body for carbon dioxide, comprising:

a metal layer; and a projection comprising an aggregate of fine metal particles provided on the metal layer, and possessing a polyhedral structure having surfaces of three faces or more of a polygon, wherein the projection has a site of reducing carbon dioxide, as at least a part of the surfaces, the metal layer contains at least one metal element selected from the group consisting of gold, silver, palladium, potassium, and calcium, each of the fine metal particles has a diameter of not less than 5 nm nor more than 500 nm, and contains the at least one metal element which is contained in the metal layer, the projection has a shape of at least one selected from a pyramid and a truncated pyramid precipitated on a surface of the metal layer, whose longest side is not less than 1 μm nor more than 50 μm, and the shape of the projection includes a bottom surface as a precipitation surface which is in contact with the surface of the metal layer and surfaces which are protruded and exposed from the metal layer, and contains at least one of a quadrangular pyramid or a quadrangular truncated pyramid having the bottom surface and the exposed surfaces.

2. The reduction catalyst body according to claim 1, wherein in an X-ray diffraction measurement of the fine metal particle, when a maximum value of a peak intensity of a {111} plane is set to $I_{111}$, a maximum value of a peak intensity of a {100} plane is set to $I_{100}$, and a maximum value of a peak intensity of a {110} plane is set to $I_{110}$, an $I_{111}/I_{100}$ ratio is 2.0 or more, and an $I_{111}/I_{110}$ ratio is 1.2 or more.

3. The reduction catalyst body according to claim 1, wherein
the metal layer is a porous metal layer, and
the projection is a porous projection.

4. A method for manufacturing the reduction catalyst body for carbon dioxide according to claim 1, comprising:
immersing, into an electrolytic solution containing a compound including a counter anion capable of forming a salt or a complex with a metal forming the metal layer, a metal base material including the metal;
applying a first electric potential at which the metal can be oxidized, to the metal base material immersed into the electrolytic solution; and
applying a second electric potential at which the metal can be reduced, to the metal base material immersed into the electrolytic solution and after being subjected to the application of the first electric potential.

5. A reduction electrode for carbon dioxide, comprising:
the reduction catalyst body according to claim 1; and
a conductive member connected to the reduction catalyst body.

6. A reduction reaction device for carbon dioxide, comprising:
a reaction cell including the reduction electrode according to claim 5 and an oxidation electrode; and
a power supply connected to the reduction electrode and the oxidation electrode.

* * * * *